US012602909B2

(12) United States Patent
Li et al.

(10) Patent No.: US 12,602,909 B2
(45) Date of Patent: Apr. 14, 2026

(54) MULTI-MODAL MODEL TRAINING METHOD, APPARATUS AND DEVICE, AND STORAGE MEDIUM

(71) Applicant: INSPUR SUZHOU INTELLIGENT TECHNOLOGY CO., LTD., Jiangsu (CN)

(72) Inventors: Xiaochuan Li, Jiangsu (CN); Baoyu Fan, Jiangsu (CN); Runze Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 411 days.

(21) Appl. No.: 18/251,232

(22) PCT Filed: Apr. 26, 2021

(86) PCT No.: PCT/CN2021/089873
§ 371 (c)(1),
(2) Date: Apr. 29, 2023

(87) PCT Pub. No.: WO2022/095345
PCT Pub. Date: May 12, 2022

(65) Prior Publication Data
US 2024/0054767 A1 Feb. 15, 2024

(30) Foreign Application Priority Data
Nov. 5, 2020 (CN) .......................... 202011224819.8

(51) Int. Cl.
*G06V 10/774* (2022.01)
*G06F 40/58* (2020.01)

(52) U.S. Cl.
CPC ............ *G06V 10/774* (2022.01); *G06F 40/58* (2020.01)

(58) Field of Classification Search
None
See application file for complete search history.

(56) References Cited

FOREIGN PATENT DOCUMENTS

| | | | | |
|---|---|---|---|---|
| CN | 105205096 A | * | 12/2015 | ........... G06F 16/951 |
| CN | 109829430 A | | 5/2019 | |

(Continued)

OTHER PUBLICATIONS

International search report for PCT/CN2021/089873 mailed on Jul. 20, 2021.

(Continued)

*Primary Examiner* — Helen Zong
(74) *Attorney, Agent, or Firm* — Dennemeyer & Associates LLC

(57) ABSTRACT

Provided are a multi-modal model training method, apparatus and device, and a storage medium. The method includes the following steps: obtaining a training sample set, and training a multi-modal model for a plurality of rounds by successively using each of training sample pair in the training sample set: during use of any one of the training sample pairs for training, obtaining an image feature of a target visual sample firstly, and then determining whether back translation needs to be performed on a target original text; when back translation needs to be performed on the target original text, performing corresponding back translation to obtain a target back-translated text, and obtaining a text feature of the target back-translated text; and training the multi-modal model based on the image feature and the text feature.

17 Claims, 5 Drawing Sheets

(56)     References Cited

FOREIGN PATENT DOCUMENTS

| CN | 110162800 | A |   | 8/2019  |          |            |
|----|-----------|---|---|---------|----------|------------|
| CN | 110956045 | A |   | 4/2020  |          |            |
| CN | 111462733 | A |   | 7/2020  |          |            |
| CN | 111597918 | A |   | 8/2020  |          |            |
| CN | 111783902 | A | * | 10/2020 | .......... | G06F 18/214 |
| CN | 112464993 | A |   | 3/2021  |          |            |

OTHER PUBLICATIONS

Search report for Chinese application 202011224819.8, filed Nov. 5, 2020.

* cited by examiner

MULTI-MODAL MODEL TRAINING METHOD, APPARATUS AND DEVICE, AND STORAGE MEDIUM

CROSS-REFERENCE TO RELATED APPLICATIONS

This is a 35 U.S.C. 371 National Stage Patent Application of International Application No. PCT/CN2021/089873, filed Apr. 26, 2021, which claims priority to Chinese application 202011224819.8, filed Nov. 5, 2020, each of which is hereby incorporated by reference in its entirety.

TECHNICAL FIELD

The disclosure relates to the technical field of computer applications, in particular to a multi-modal model training method, apparatus and device, and a storage medium.

BACKGROUND

With the rapid development of computer technology, multi-modal learning has gradually become a new research hotspot. In recent years, with the popularity of deep learning, machine learning-based artificial intelligence has made great progress. For example, due to the wide application of convolutional neural networks, target detection, semantic segmentation, pattern recognition and other directions in the field of computer vision have made great progress; and with the invention of a transformer encoder, machine translation, text error correction, text search and other tasks in the field of natural language processing have been greatly improved. The rapid development of these fields has brought more and more attention to the field of multi-modal learning. On the one hand, it is because humans understand the world in multiple dimensions. They usually see with their eyes, hear with their ears, smell with their nose, and perceive with their bodies. Besides, they handle the complex information comprehensively with their brain to realize the perception, understanding, and reasoning of objective things. Multi-modal learning may allow computers to better mimic human behaviors and simulate human perception. On the other hand, the rapid development of the field of unimodal, such as computer vision and natural language processing, also provides a strong theoretical and practical foundation for multi-modal learning.

The process of multi-modal learning is also a process of training a multi-modal model. At present, training of the multi-modal model has the problems that the quantity of training samples is small, which makes it difficult for the model to converge; and moreover, the distribution deviation of the training samples is large, so that the phenomenon of model over-fitting is prone to occurring.

SUMMARY

The objective of the disclosure is to provide a multi-modal model training method, apparatus and device, and a storage medium, in order to increase the quantity of training sample pairs, increase the model convergence speed, and meanwhile effectively avoid the phenomenon of over-fitting and improve the model robustness.

In order to solve the above-mentioned technical problems, the disclosure provides the following technical solutions:

A multi-modal model training method includes:

obtaining a training sample set, which includes a plurality of training sample pairs, each of the training sample pairs including a visual sample and a corresponding original text; and training a multi-modal model for a plurality of rounds by successively using each of the training sample pairs in the training sample set until reaching a set end condition, wherein for any one of the training sample pairs in the training sample set, each time the multi-modal model is trained by using the training sample by the following steps:

obtaining an image feature of a target visual sample included in the training sample pair;

determining whether back translation needs to be performed on a target original text included in the training sample pair;

when back translation needs to be performed on the target original text included in the training sample pair, performing back translation on the target original text to obtain a target back-translated text;

obtaining a text feature of the target back-translated text; and training the multi-modal model based on the image feature of the target visual sample and the text feature of the target back-translated text.

In an implementation of the disclosure, the performing back translation on the target original text includes:

performing back translation on the target original text through a back translation module, where the back translation module includes at least two translation components connected in sequence, an input text of a first translation component of the at least two translation components is the target original text, and an output text of a last translation component is in a same language as the target original text.

In an implementation of the disclosure, during the process of performing back translation on the target original text through a back translation module, an input text of each of the translation components included in the back translation module is determined by the following steps:

determining the target original text as the input text of the first translation component included in the back translation module; and for any one of translation components other than the first translation component included in the back translation module, determining an input text of the translation component based on output texts of a previous translation component of the translation component.

In an implementation of the disclosure, the determining an input text of the translation component based on output texts of a previous translation component of the translation component includes:

calculating a loss rate of each of the output texts of the previous translation component of the translation component; and selecting part of the output texts of the previous translation component of the translation component based on the loss rates, and determining the selected output texts as the input text of the translation component.

In an implementation of the disclosure, the selecting part of the output texts of the previous translation component of the translation component based on the loss rates, and determining the selected output texts as the input text of the translation component includes:

determining N output texts, with the smallest loss rate, of the previous translation component of the translation component as the input text of the translation component; or determining an output text, with a loss rate less than a preset loss rate threshold, of the previous translation component of the translation component as the input text of the translation component.

In an implementation of the disclosure, each of the translation components included in the back translation module respectively includes a plurality of translation models.

In an implementation of the disclosure, the performing back translation on the target original text to obtain a target back-translated text includes:

performing back translation on the target original text to obtain a plurality of back-translated texts; and randomly selecting a text among the plurality of back-translated texts and determining the text as the target back-translated text.

In an implementation of the disclosure, the determining whether back translation needs to be performed on a target original text included in the training sample pair includes:

determining whether back translation needs to be performed on the target original text included in the training sample pair based on a preset back translation parameter.

In an implementation of the disclosure, when it is determined that back translation does not need to be performed on the target original text, the method further includes:

obtaining a text feature of the target original text; and training the multi-modal model based on the image feature of the target visual sample and the text feature of the target original text.

A multi-modal model training apparatus includes:

a training dataset obtaining unit, configured to obtain a training sample set, the training sample set including a plurality of training sample pairs, each of the training sample pairs including a visual sample and a corresponding original text; and a multi-modal model training unit, configured to train a multi-modal model for a plurality of rounds by successively using each of the training sample pairs in the training sample set until reaching a set end condition, where the multi-modal model is trained by using any one of the training sample pairs in the training sample set each time through the following subunits:

an image feature obtaining subunit, configured to obtain an image feature of a target visual sample included in the training sample pair;

a back translation determining subunit, configured to determine whether back translation needs to be performed on a target original text included in the training sample pair, and to trigger a back translation subunit when back translation needs to be performed on the target original text included in the training sample pair;

the back translation subunit, configured to perform back translation on the target original text to obtain a target back-translated text;

a text feature obtaining subunit, configured to obtain a text feature of the target back-translated text; and a multi-modal model training subunit, configured to train the multi-modal model based on the image feature of the target visual sample and the text feature of the target back-translated text.

A multi-modal model training device includes:

a memory, configured to store a computer program; and a processor, configured to implement, when executing the computer program, the steps of any one of the multi-modal model training methods described above.

A computer-readable storage medium has a computer program stored thereon, and the computer program, when executed by a processor, implements the steps of any one of the multi-modal model training methods described above.

BRIEF DESCRIPTION OF THE DRAWINGS

In order to more clearly describe the technical solutions of the embodiments of the disclosure or in the prior art, drawings that are to be referred for description of the embodiments or the prior art will be briefly described hereinafter. Apparently, the drawings described hereinafter merely illustrate some embodiments of the disclosure, and a person of ordinary skill in the art may also derive other drawings based on the drawings described herein without any creative effort.

DETAILED DESCRIPTION OF THE EMBODIMENTS

In order to make a person skilled in the art better understand the solutions of the disclosure, the disclosure is further described in detail below with reference to the accompanying drawings and detailed description. Apparently, the described embodiments are merely part of the embodiments of the disclosure, rather than all the embodiments. Based on the embodiments of the disclosure, all other embodiments obtained by a person of ordinary skill in the art without any creative effort fall within the protection scope of the disclosure.

Input of multi-modal learning includes both visual and textual modalities, and a computer model acquires the capacity of perception and understanding by learning samples from the two modalities simultaneously. The visual modality includes pictures, videos, etc.; and the textual modality includes summary documents, question answering, dialogues, etc. in various languages. Typical visual-text multi-modal learning topics include visual question answering (VQA), which aims to give computers the capacity to reason about answers based on content of pictures and questions, visual-language matching (VLM), which aims to give computers the capacity to determine whether pictures and texts match, etc.

Figure 1:
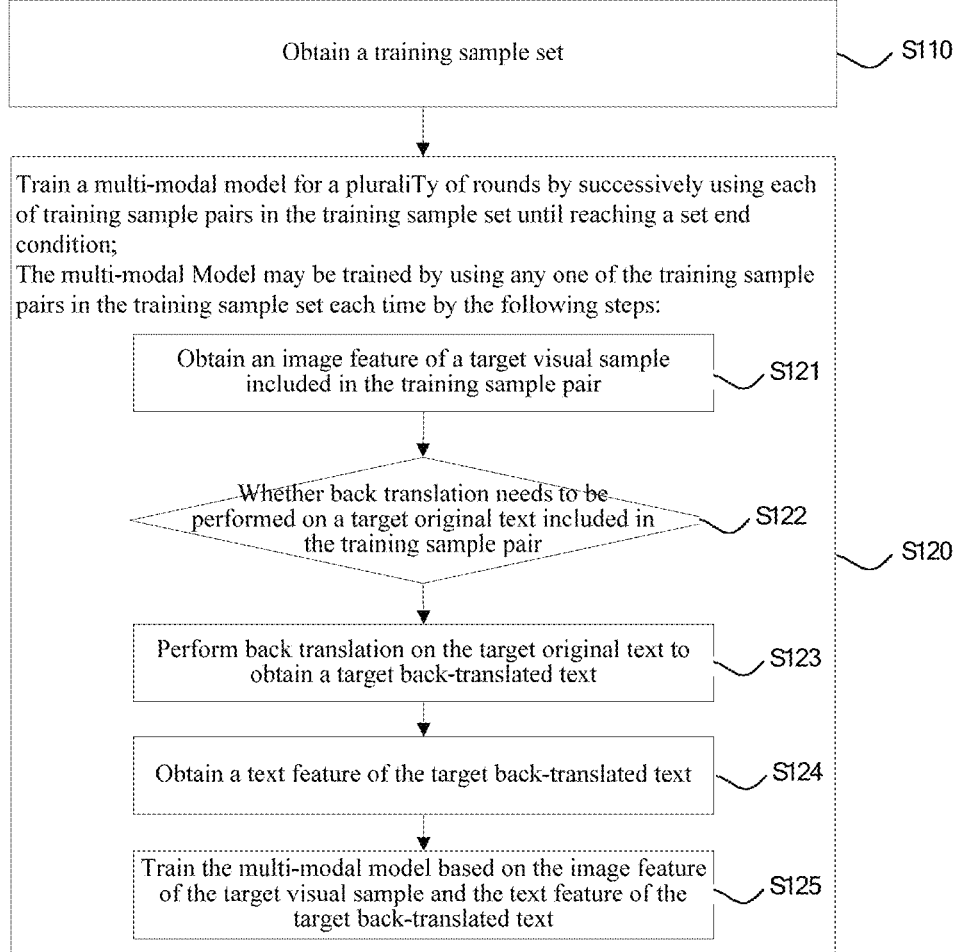
FIG. 1 is an implementation flow diagram of a multi-modal model training method according to an embodiment of the disclosure.

As shown in FIG. 1, which is an implementation flow diagram of a multi-modal model training method according to an implementation of the disclosure, the method may include the following steps:

S110: Obtain a training sample set.

The training sample set includes a plurality of training sample pairs, and each of the training sample pairs includes a visual sample and a corresponding original text.

In the embodiment of the disclosure, the training sample set may be obtained by data collection and other means. The training sample set may include the plurality of training sample pairs, and each of the training sample pairs includes one visual sample and the corresponding original text. The visual sample may be an image or a video.

S120: Train a multi-modal model for a plurality of rounds by successively using each of the training sample pairs in the training sample set until reaching a set end condition.

In practical applications, the multi-modal model may be constructed in advance. After the training sample set is obtained, the multi-modal model may be trained for a plurality of rounds by successively using each of the training sample pairs in the training sample set. Each time after each of the training sample pairs in the training sample set is used, it may be considered that a round of training is performed. After the multi-modal model is trained for a plurality of rounds, when the number of the rounds of training is greater than a preset round number threshold, or when the accuracy of the trained multi-modal model reaches a preset accuracy threshold, it may be considered that the set end condition is reached, the training is completed, and the trained multi-modal model is obtained. The trained multi-modal model may be then applied in actual scenarios, for example, visual question answering and picture-text matching.

The multi-modal model may be trained by using any one of the training sample pairs in the training sample set each time by the following steps:

S121: Obtain an image feature of a target visual sample included in the training sample pair.

Each of the training sample pairs of the training sample set includes one visual sample and the corresponding original text.

When the multi-modal model is to be trained by using any one of the training sample pairs in the training sample set, the image feature of the target visual sample included in the training sample pair may be obtained.

Specifically, if it is the first time to use a training sample pair to train the multi-modal model in a first round, image feature extraction may be performed on the target visual sample included in the training sample pair to obtain the image feature of the target visual sample.

If a training sample pair is used for training the multi-modal model in a second and subsequent rounds, the image feature of the target visual sample obtained during the first round of training may be obtained directly, which improves the efficiency of feature extraction. Of course, image feature extraction may also be performed on the target visual sample in each round of training to obtain corresponding image features.

S122: Determine whether back translation needs to be performed on a target original text included in the training sample pair.

When the multi-modal model is to be trained by using any one of the training sample pairs in the training sample set, whether back translation needs to be performed on the target original text included in the training sample pair may be determined.

In an implementation of the disclosure, whether back translation needs to be performed on the target original text included in the training sample pair may be determined based on a preset back translation parameter.

In the embodiment of the disclosure, a back translation parameter may be set in advance, and a probability of data augmentation may be determined based on the back translation parameter. When the multi-modal model is trained by using each of the training sample pairs in the training sample set, whether back translation needs to be performed on the target original text included in the training sample pair may be determined based on the probability of data augmentation determined based on the back translation parameter. In practical applications, if the quantity of the training sample pairs in the training sample set is large, a small back translation parameter may be set, so as to determine that a small probability of data augmentation is obtained. On the contrary, if the quantity of the training sample pairs in the training sample set is small, a large back translation parameter may be set, so as to determine that a large probability of data augmentation is obtained.

For example, if the probability of data augmentation determined based on the back translation parameter is 60%, when the multi-modal model is to be trained by each of the training sample pairs, there may be a probability of 60% that back translation needs to be performed on the training sample pair.

If it is determined that back translation needs to be performed on the target original text included in the training sample pair, the operation of step S123 may continue to be performed.

If it is determined that back translation does not need to be performed on the target original text included in the training sample pair, a text feature of the target original text may be obtained, and the multi-modal model is trained based on the image feature of the target visual sample and the text feature of the target original text.

S123: Perform back translation on the target original text to obtain a target back-translated text.

Each time when the multi-modal model is to be trained by using any one of the training sample pairs in the training sample set, if it is determined that back translation needs to be performed on the target original text included in the training sample pair, the operation of back translation may be performed on the target original text to obtain the target back-translated text. The target back-translated text is in the same language as the target original text.

In an implementation of the disclosure, back translation is performed on the target original text to obtain a plurality of back-translated texts, and one text is randomly selected from the plurality of back-translated texts and determined as the target back-translated text. By randomly selecting one text from the plurality of back-translated texts and determining the text as the target back-translated text, during different rounds of training, the probability of finally obtaining different back-translated texts after back translation is performed on the original text of the same training sample pair is high, thereby augmenting training samples.

After the target back-translated text is obtained, the target back-translated text may replace the target original text, and constitute a new training sample pair with the target visual sample, and the multi-modal model is trained with the new training sample pair.

S124: Obtain a text feature of the target back-translated text.

After the target back-translated text is obtained, language feature encoding and other operations may be performed on the target back-translated text to obtain the text feature of the target back-translated text.

S125: Train the multi-modal model based on the image feature of the target visual sample and the text feature of the target back-translated text.

After the image feature of the target visual sample and the text feature of the target back-translated text are obtained by the above steps, feature fusion may be performed on the image feature of the target visual sample and the text feature of the target back-translated text, and the multi-modal model is trained based on fused features.

The multi-modal model is trained for a plurality of rounds by applying the method according to the embodiment of the disclosure, and in each round of training, the original text included in each of the training sample pairs may have a certain probability to be back translated to obtain a back-translated text, and the obtained back-translated text constitutes a new training sample pair together with the visual sample included in the corresponding training sample pair, so that the quantity of the training sample pairs may be increased, and the model convergence speed may be increased. Moreover, since the new training sample pairs are obtained based on the training sample pairs in the training sample set, the distribution deviation of training samples is small, which may effectively avoid the phenomenon of over-fitting and improve the robustness of the multi-modal model obtained by training.

In an implementation of the disclosure, back translation is performed on the target original text, and specifically, back translation may be performed on the target original text through a back translation module.

In the embodiment of the disclosure, the back translation module may include at least two translation components connected in sequence. An input text of a first translation component of the at least two translation components is the target original text, and an output text of a last translation component is in the same language as the target original text.

When the multi-modal model is to be trained by using any one of the training sample pairs in the training sample set, and it is determined that back translation needs to be performed on the target original text included in the training sample pair, corresponding translation processing may be performed through the plurality of sequentially-connected translation components of the back translation module to obtain the target back-translated text.

For example, the language of the target original text is Chinese and the back translation module includes two translation components connected in sequence, so that a first translation component may be used for Chinese-English translation, and a second translation component may be used for English-Chinese translation. After the target original text is input into the first translation component, a language of an intermediate text output by the first translation component is English, the intermediate text is input into the second translation component, and a language of an output text of the second translation component is Chinese, which is the same as the language of the target original text.

For another example, the language of the target original text is English and the back translation module includes four translation components connected in sequence, so that a first translation component may be used for English-German translation, a second translation component may be used for German-French translation, a third translation component may be used for French-Russian translation, and a fourth translation component may be used for Russian-English translation.

When the back translation module includes a plurality of translation components, what is needed is merely that the language of the input text of the first translation component and the language of the output text of the last translation component are the same as the language of the original text, and the language of the output text of the previous translation component is the same as the language of the input text of the later translation component.

In an implementation of the disclosure, during the process of performing back translation on the target original text through the back translation module, the input text of each of the translation components included in the back translation module may be determined by the following steps:

determine the target original text as the input text of the first translation component included in the back translation module; and for any one of translation components other than the first translation component included in the back translation module, determine an input text of the translation component based on output texts of a previous translation component of the translation component.

For ease of description, the above two steps are combined for illustration.

In the embodiment of the disclosure, the back translation module includes the at least two translation components connected in sequence. During the process of performing back translation on the target original text through the back translation module, the target original text may be directly determined as the input text of the first translation component. For any one of translation components other than the first translation component included in the back translation module, the input text of the translation component may be determined based on the output texts of the previous translation component of the translation component. A plurality of output texts may be obtained when each of the translation components performs translation processing on the input text thereof. For any one of translation components other than the first translation component, all the output texts of the previous translation component of the translation component may be used as the input text of the translation component.

In an implementation of the disclosure, for any one of translation components other than the first translation component included in the back translation module, a loss rate of each of the output texts of the previous translation component of the translation component may be calculated firstly, and then part of the output texts of the previous translation component of the translation component are selected based on the loss rates, and determined as the input text of the translation component.

It is to be understood that the translation component obtains the output texts while translating the input text, and the translation quality may be represented by the loss rate. The higher the translation quality, the smaller the loss rate; and the lower the translation quality, the greater the loss rate.

When the input text of any of the translation components other than the first translation component is determined, the loss rate of each of the output texts of the previous translation component of the translation component may be calculated firstly, which may be specifically calculated by a loss function. Then, part of the output texts of the previous translation component of the translation component are selected based on the loss rates, and the selected texts are determined as the input text of the translation component.

Specifically, N output texts, with the smallest loss rate, of the previous translation component of the translation component may be determined as the input text of the translation component; or, an output text, with a loss rate less than a preset loss rate threshold, of the previous translation component of the translation component are determined as the input text of the translation component.

The lower the loss rate, the higher the translation quality. In the embodiment of the disclosure, since N output texts, with the smallest loss rate, of a previous translation component are used as an input text of a later translation component, or, an output text, with a loss rate less than the preset loss rate threshold, of the previous translation component are used as the input text of the later translation component, texts with high loss rates may be effectively prevented from being input into the translation component to cause reduction of the overall translation quality, and moreover, the texts with the high loss rates are not subjected to subsequent translation processing, which may improve the speed and efficiency of back translation.

In an implementation of the disclosure, each of the translation components included in the back translation module may respectively include a plurality of translation models.

Specifically, each of the translation components may respectively include a plurality of translation models of the same kind of translation, and the plurality of translation models of the same kind of translation may be obtained based on different training data. For example, the back translation module includes two translation components, the language of the original text is English, a translation component I includes a plurality of different English-German translation models, and a translation component II includes a plurality of different German-English translation models.

Alternatively, each of the translation components may respectively include a plurality of translation models for different kinds of translations. For example, the back translation module includes two translation components, the language of the original text is English, a translation component I includes a plurality of translation models such as an English-German translation model, an English-French translation model and an English-Russian translation model, and a translation component II includes a plurality of translation models such as a German-English translation model, a French-English translation model and a Russian-English translation model.

In practical applications, various translation models may be trained through a multilingual corpus.

Figure 2:
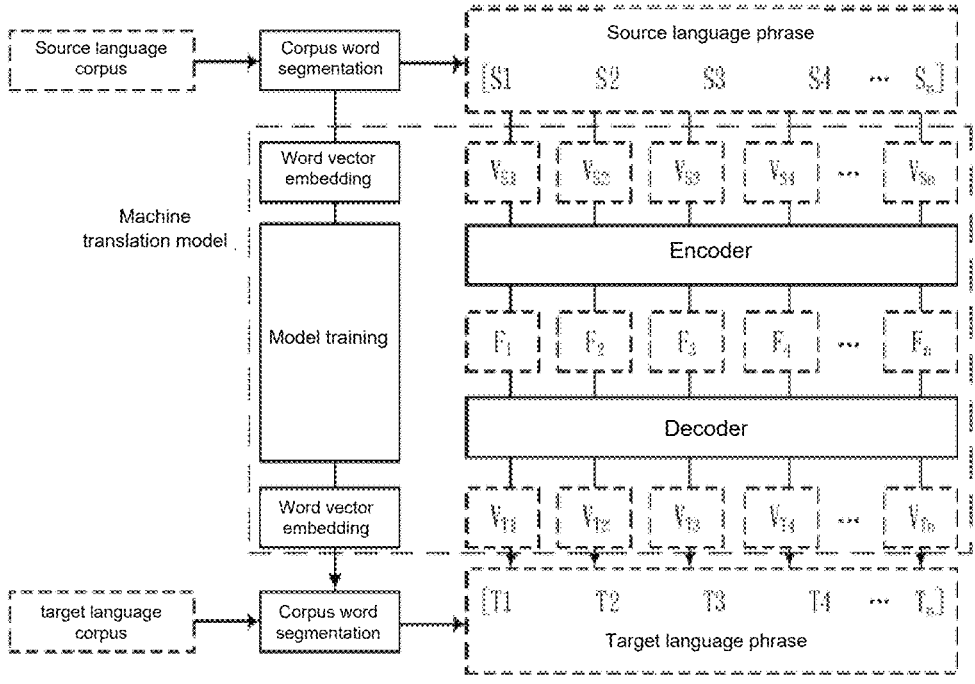
FIG. 2 is a schematic diagram of a training process of a machine translation model according to an embodiment of the disclosure.

The training process of the translation model is shown in FIG. 2. Firstly, word segmentation may be performed on a source language corpus and a corresponding target language corpus. For example, a source language (English) "Heise student in school." is segmented into ["he", "is", "a", "student", "in", "school", "."], a target language (German) "EristSchüler in der Schule." is segmented into ["er", "ist", "schüler", "in", "der", "schule", "."], and word vector embedding is then performed on the corresponding word segments to convert the word segments into feature vectors. Source language word vectors are then input into an encoder for vector encoding and into a decoder for translation. The translation model is optimized by reverse iteration between a translation result and a loss function of target language word vectors.

Figure 3:
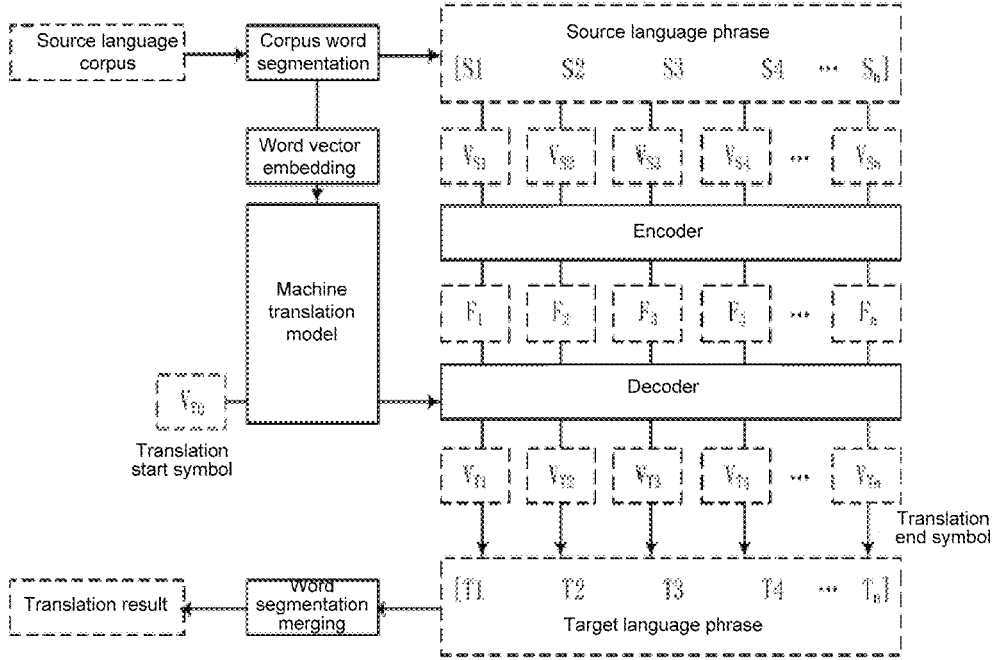
FIG. 3 is a schematic diagram of a translation process of a machine translation model according to an embodiment of the disclosure.

As shown in FIG. 3, during use of the translation model for translation, the source language corpus is firstly subjected to word segmentation and encoding to obtain the encoded vectors. A translation start symbol $V_{TO}$ is then input to the decoder together with the encoded vectors. The next word is translated in turn until a translation end symbol $V_{Tn}$ appears, and a target language statement is output.

Figure 4:
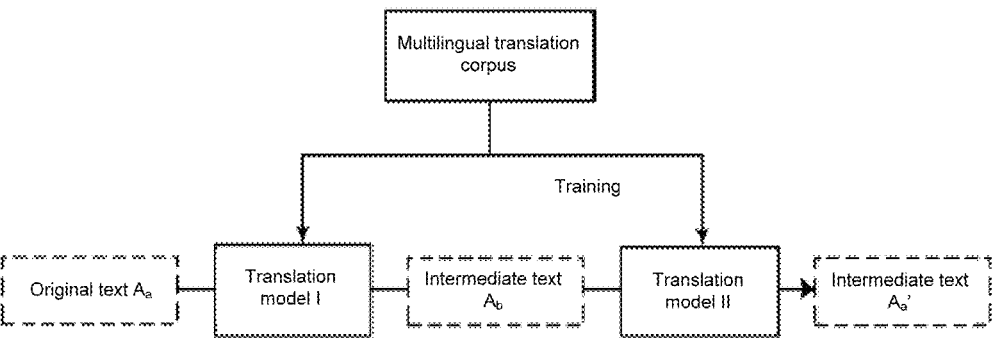
FIG. 4 is a schematic diagram of a back translation process according to an embodiment of the disclosure.

In the embodiment of the disclosure, as shown in FIG. 4, the translation model may be trained by a publicly available translation dataset firstly, for example, after an English-German translation model I and a German-English translation model II are trained through a publicly available wmt English-German translation dataset, when the original text in the training sample pair is to be back-translated, the original text $A_a$ in English may be translated into an intermediate text Ab in German by the model I and then translated back into a back-translated text $A_a'$ in English by the model II, and the back-translated text replaces the original text to obtain a new sample pair. For example, by inputting "Heise student in school." into the translation model I, "EristSchüler in der Schule." (German) is obtained, and input into the model II in sequence to obtain an English synonymous sentence of "He is a pupil in the school.". In a multi-modal sample, additional visual sample-text pairs may be constructed, thereby achieving a function of data augmentation.

Figure 5:
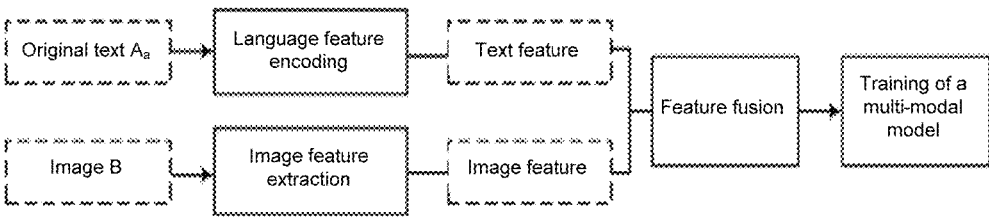
FIG. 5 is a schematic diagram of a multi-modal model training framework in the related art.

In the related art, during training of the multi-modal model, the multi-modal model is trained by directly using each of the training sample pairs in the training sample set. As shown in FIG. 5, during use of any one of the training sample pairs in the training sample set, language feature encoding is performed on the original text thereof to obtain the text feature, image feature extraction is performed on an image thereof to obtain the image feature, then the text feature and the image feature are subjected to feature fusion, and then input into the multi-modal model for cross-modal learning, and model parameters are optimized iteratively based on different training tasks. Without data augmentation, if the quantity of training samples is small, it may be difficult for the model to converge, and moreover, the distribution deviation of the training samples is large, which may cause the phenomenon of model over-fitting.

Figure 6:
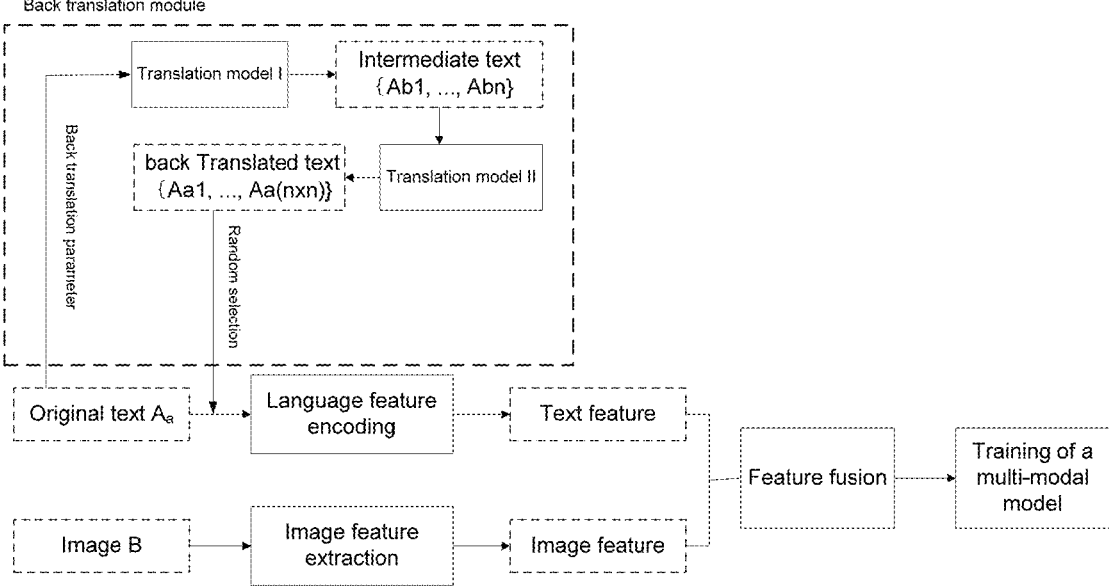
FIG. 6 is a schematic diagram of a multi-modal model training framework according to an embodiment of the disclosure.

In the disclosure, during training of the multi-modal model, the training sample pairs may be extended through the back translation module, so that the richness of the training sample pairs is enhanced, and the effects of data augmentation and over-fitting inhibition are achieved. As shown in FIG. 6, during use of any one of the training sample pairs in the training sample set, whether back translation needs to be performed is determined based on the back translation parameters firstly. If back translation needs to be performed, the original text $A_a$ is input into the translation model I of the back translation module, intermediate texts $\{A_{b1}, \ldots, A_{bn}\}$ are selected from the output texts of the translation model I, the intermediate texts are input into the translation model II, back-translated texts $\{A_{a1}, \ldots, A_{a(nxn)}\}$ are selected from the output texts of the translation model II, then a text is randomly selected from the back-translated texts to replace the original text, and language feature encoding is performed on the text to obtain the text feature. If back translation does not need to be performed, language feature encoding may be directly performed on the original text to obtain the text feature, image feature extraction is performed on an image B in the training sample pair to obtain the image feature, the text feature and the image feature are subjected to feature fusion, and then input into the multi-modal model for cross-modal learning, and the model parameters are optimized iteratively based on different training tasks.

By introduction of the back translation module, the embodiments of the disclosure extends the sample richness of multi-modal learning, realizes the effect of data augmentation, alleviates the phenomenon of over-fitting, and may improve the model accuracy.

Corresponding to the above-mentioned method embodiment, an implementation of the disclosure further provides a multi-modal model training apparatus. The multi-modal model training apparatus described below may be cross-referenced to the multi-modal model training method described above.

Figure 7:
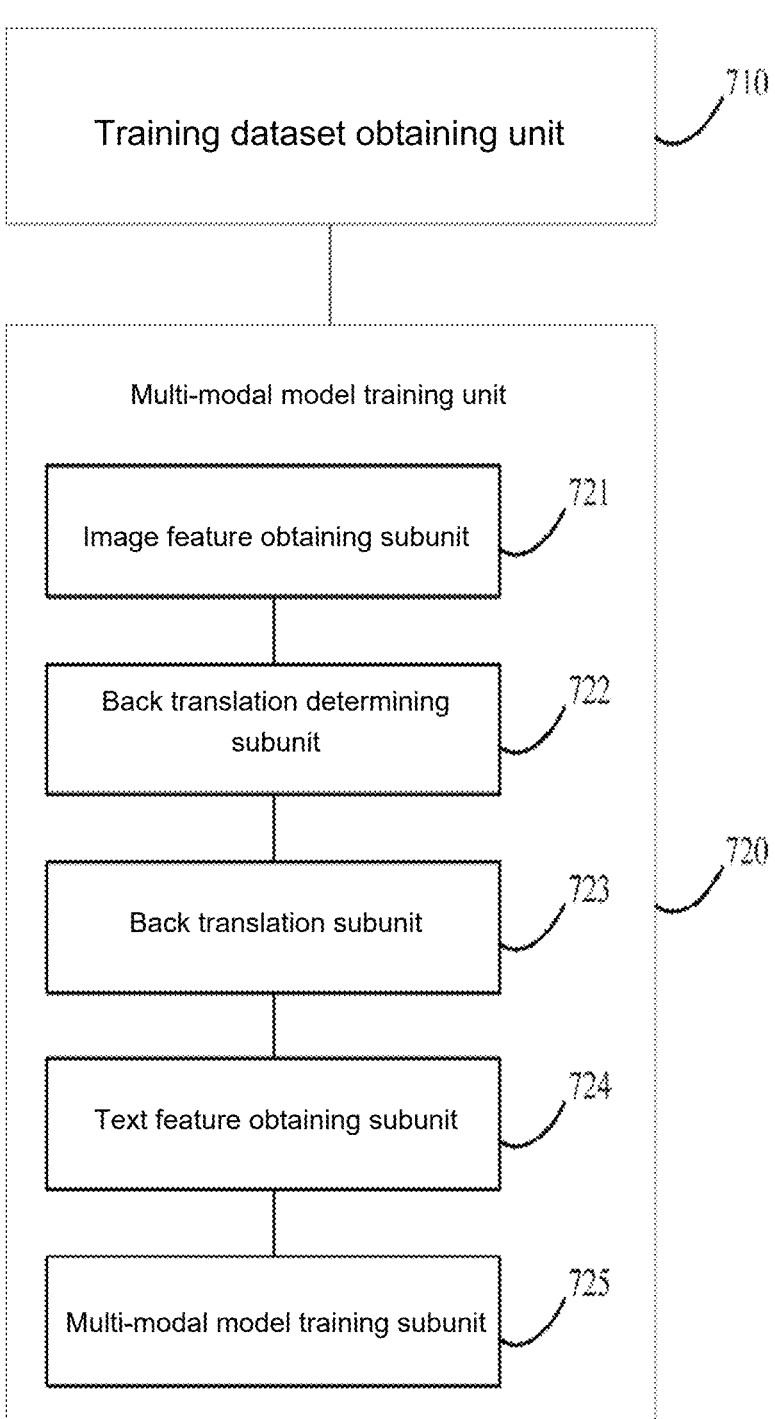
FIG. 7 is a schematic structural diagram of a multi-modal model training apparatus according to an embodiment of the disclosure.

As shown in FIG. 7, the apparatus may include the following units:

a training dataset obtaining unit 710, configured to obtain a training sample set, the training sample set including a plurality of training sample pairs, each of the training sample pairs including a visual sample and a corresponding original text; and a multi-modal model training unit 720, configured to train a multi-modal model for a plurality of rounds by successively using each of the training sample pairs in the training sample set until reaching a set end condition. The multi-modal model is trained by using any one of the training sample pairs in the training sample set each time through the following subunits:

an image feature obtaining subunit 721, configured to obtain an image feature of a target visual sample included in the training sample pair;

a back translation determining subunit 722, configured to determine whether back translation needs to be performed on a target original text included in the training sample pair, and to trigger a back translation subunit 723 if back translation needs to be performed on the target original text included in the training sample pair;

the back translation subunit 723, configured to perform back translation on the target original text to obtain a target back-translated text;

a text feature obtaining subunit 724, configured to obtain a text feature of the target back-translated text; and a multi-modal model training subunit 725, configured to train the multi-modal model based on the image feature of the target visual sample and the text feature of the target back-translated text.

The multi-modal model is trained for a plurality of rounds by applying the apparatus according to the embodiment of the disclosure, and in each round of training, the original text included in each of the training sample pairs may have a certain probability to be back translated to obtain a back-translated text, and the obtained back-translated text constitutes a new training sample pair together with the visual sample included in the corresponding training sample pair, so that the quantity of the training sample pairs may be increased, and the model convergence speed may be increased. Moreover, since the new training sample pairs are obtained based on the training sample pairs in the training sample set, the distribution deviation of training samples is small, which may effectively avoid the phenomenon of over-fitting and improve the robustness of the multi-modal model obtained by training.

In an implementation of the disclosure, the back translation subunit 723 is configured to: perform back translation on the target original text through a back translation module.

The back translation module includes at least two translation components connected in sequence. An input text of a first translation component of the at least two translation components is the target original text, and an output text of a last translation component is in a same language as the target original text.

In an implementation of the disclosure, the multi-modal model training unit 720 further includes an input text determining subunit configured to determine, during the process of performing back translation on the target original text through the back translation module, an input text of each of the translation components included in the back translation module by the following step:

determine the target original text as the input text of the first translation component included in the back translation module; and for any one of translation components other than the first translation component included in the back translation module, determine an input text of the translation component based on output texts of a previous translation component of the translation component.

In an implementation of the disclosure, the input text determining subunit is configured to:

calculate a loss rate of each of the output texts of the previous translation component of the translation component; and select part of the output texts of the previous translation component of the translation component based on the loss rates, and determine the selected output texts as the input text of the translation component.

In an implementation of the disclosure, the input text determining subunit is configured to:

determine N output texts, with the smallest loss rate, of the previous translation component of the translation component as the input text of the translation component; or determine an output text, with a loss rate less than a preset loss rate threshold, of the previous translation component of the translation component as the input text of the translation component.

In an implementation of the disclosure, each of the translation components included in the back translation module respectively includes a plurality of translation models.

In an implementation of the disclosure, the back translation subunit 723 is configured to:

perform back translation on the target original text to obtain a plurality of back-translated texts;

and randomly select a text among the plurality of back-translated texts and determine the text as the target back-translated text. In an implementation of the disclosure, the back translation determining subunit 722 is configured to: determine whether back translation needs to be performed on the target original text included in the training sample pair based on a preset back translation parameter.

In an implementation of the disclosure, the multi-modal model training unit 720 is further configured to:

obtain, when it is determined that back translation does not need to be performed on the target original text, a text feature of the target original text; and train the multi-modal model based on the image feature of the target visual sample and the text feature of the target original text.

Corresponding to the above-mentioned method embodiment, an implementation of the disclosure further provides a multi-modal model training device. The device includes:

a memory, configured to store a computer program; and a processor, configured to implement, when executing the computer program, the steps of the above-mentioned multi-modal model training method.

Figure 8:
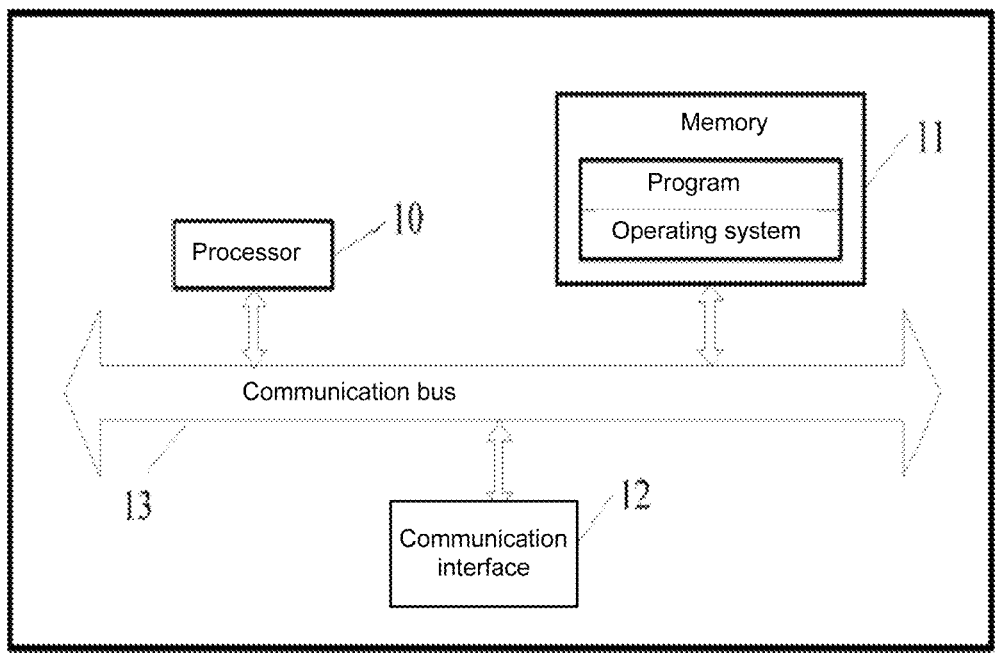
FIG. 8 is a schematic structural diagram of a multi-modal model training device according to an embodiment of the disclosure.

As shown in FIG. 8, which is a schematic structural diagram of the multi-modal model training device, the multi-modal model training device may include: the processor 10, the memory 11, a communication interface 12, and a communication bus 13. The processor 10, the memory 11 and the communication interface 12 communicate with each other via the communication bus 13.

In the embodiment of the disclosure, the processor 10 may be a central processing unit (CPU), an application-specific integrated circuit, a digital signal processor, a field-programmable gate array, or other programmable logic devices.

The processor 10 may call the program stored in the memory 11, and specifically, the processor 10 may execute the operations in the embodiment of the multi-modal model training method.

The memory 11 is configured to store one or more programs which may include program codes. The program codes include computer operation instructions. In the embodiment of the disclosure, the memory 11 at least stores programs used for implementing the following functions:

obtaining a training sample set, the training sample set including a plurality of training sample pairs, each of the training sample pairs including a visual sample and a corresponding original text;

and training a multi-modal model for a plurality of rounds by successively using each of the training sample pairs in the training sample set until reaching a set end condition.

For any one of the training sample pairs in the training sample set, each time the multi-modal model is trained by using the training sample by the following steps:

obtain an image feature of a target visual sample included in the training sample pair;

determine whether back translation needs to be performed on a target original text included in the training sample pair;

if back translation needs to be performed on the target original text included in the training sample pair, perform back translation on the target original text to obtain a target back-translated text;

obtain a text feature of the target back-translated text; and train the multi-modal model based on the image feature of the target visual sample and the text feature of the target back-translated text.

In an implementation, the memory 11 may include a program storage region and a data storage region. The program storage region may store an operating system, as well as applications required for at least one function (for example, a feature extraction function and a model training function), etc. The data storage region may store data created during use, such as training data and feature data.

In addition, the memory 11 may include a high-speed random access memory, and may also include a non-volatile memory such as at least one disk memory device, or other volatile solid-state memory devices.

The communication interface 12 may be an interface to a communication module for connection to other devices or systems.

Of course, it is to be noted that the structure shown in FIG. 8 does not constitute a limitation to the multi-modal model training device according to the embodiment of the disclosure, and in practical applications, the multi-modal model training device may include more or less components than shown in FIG. 8, or a combination of some components.

Corresponding to the above-mentioned method embodiment, an implementation of the disclosure further provides a computer-readable storage medium having a computer program stored thereon. The computer program, when executed by a processor, implements the steps of the above-mentioned multi-modal model training method.

The embodiments in this specification are described in a progressive manner, with each embodiment focusing on the differences from the other embodiments, and the same or similar parts between the embodiments may be cross-referenced.

It may be further appreciated by a skilled person that the units and algorithmic steps of examples described in connection with the embodiments disclosed herein may be implemented as electronic hardware, computer software, or a combination of both, and that the components and steps of the examples have been described in general terms by function in the above descriptions in order to clearly illustrate the interchangeability of hardware and software. Whether to implement such functionality as hardware or software depends upon the particular application and design constraints imposed on the technical solutions. A skilled person may implement the described functionality in varying ways for each particular application, but such implementation should not be interpreted as causing a departure from the scope of the disclosure.

The steps of a method or algorithm described in connection with the embodiments disclosed herein may be implemented directly as hardware, a software module executed by a processor, or a combination of both. The software module may reside in an random access memory (RAM), an internal memory, a read-only memory (ROM), an electrically programmable ROM, an electrically erasable programmable ROM, a register, a hard disk, a removable disk, a CD-ROM, or any other form of storage medium known in the art.

While the principles and implementations of the disclosure have been described herein with reference to specific examples, the description of the above embodiments is intended merely to facilitate an understanding of the technical solutions of the disclosure and its core concepts. It is to be noted that a person of ordinary skill in the art may also make improvements and modifications to the disclosure without departing from the principles of the disclosure, which also fall within the protection scope of the claims of the disclosure.

What is claimed is:

1. A multi-modal machine translation model training method, comprising:

obtaining a training sample set, the training sample set comprising a plurality of training sample pairs, each of the training sample pairs comprising a visual sample and a corresponding original text; and training a multi-modal machine translation model for a plurality of rounds by successively using each of the training sample pairs in the training sample set until reaching a set end condition, wherein for any one of the training sample pairs in the training sample set, each time the multi-modal machine translation model is trained by using the training sample by the following steps:

obtaining an image feature of a target visual sample comprised in the training sample pair;

determining whether back translation needs to be performed on a target original text comprised in the training sample pair;

when back translation needs to be performed on the target original text comprised in the training sample pair, the original text is input into a first translation model of a back translation module intermediate texts are selected from output texts of the first translation model, and the intermediate texts are input into a second translation model of the back translation module, a target back-translated text is randomly selected among back-translated texts output from the second translation model, and obtaining a text feature of the target back-translated text by performing language feature encoding on the target back-translated text; and training the multi-modal machine translation model based on the image feature of the target visual sample and the text feature of the target back-translated text.

2. The method according to claim 1, wherein the back translation module comprises at least two translation components connected in sequence, an input text of a first translation component of the at least two translation components is the target original text, and an output text of a last translation component is in a same language as the target original text.

3. The method according to claim 2, wherein during the process of performing back translation on the target original text through a back translation module, an input text of each of the translation components comprised in the back translation module is determined by the following steps:

determining the target original text as the input text of the first translation component comprised in the back translation module; and for any one of translation components other than the first translation component comprised in the back translation module, determining an input text of the translation component based on output texts of a previous translation component of the translation component.

4. The method according to claim 3, wherein the determining an input text of the translation component based on output texts of a previous translation component of the translation component comprises:

calculating a loss rate of each of the output texts of the previous translation component of the translation component; and selecting part of the output texts of the previous translation component of the translation component based on the loss rates, and determining the selected output texts as the input text of the translation component.

5. The method according to claim 4, wherein the selecting part of the output texts of the previous translation component of the translation component based on the loss rates, and determining the selected output texts as the input text of the translation component comprises:

determining N output texts, with the smallest loss rate, of the previous translation component of the translation component as the input text of the translation component; or determining an output text, with a loss rate less than a preset loss rate threshold, of the previous translation component of the translation component as the input text of the translation component.

6. The method according to claim 2, wherein each of the translation components comprised in the back translation module respectively comprises a plurality of translation models.

7. The method according to claim 1, wherein the determining whether back translation needs to be performed on a target original text comprised in the training sample pair comprises:

determining whether back translation needs to be performed on the target original text comprised in the training sample pair based on a preset back translation parameter.

8. The method according to claim 1, wherein when it is determined that back translation does not need to be performed on the target original text, the method further comprises:

obtaining a text feature of the target original text; and training the multi-modal machine translation model based on the image feature of the target visual sample and the text feature of the target original text.

9. A multi-modal machine translation model training device, comprising:

a memory, configured to store a computer program; and a processor, configured to execute the computer program to:

obtain a training sample set, the training sample set comprising a plurality of training sample pairs, each of the training sample pairs comprising a visual sample and a corresponding original text; and train a multi-modal machine translation model for a plurality of rounds by successively using each of the training sample pairs in the training sample set until reaching a set end condition, wherein for any one of the training sample pairs in the training sample set, each time the multi-modal machine translation model is trained by using the training sample by the following steps:

obtaining an image feature of a target visual sample comprised in the training sample pair;

determining whether back translation needs to be performed on a target original text comprised in the training sample pair;

when back translation needs to be performed on the target original text comprised in the training sample pair, the original text is input into a first translation model of a back translation module, intermediate texts are selected from output texts of the first translation model, and the intermediate texts are input into a second translation model of the back translation module, a target back-translated text is randomly selected among bask-translated texts output from the second translation model, and obtaining a text feature of the target back-translated text by performing language feature encoding on the target back-translated text; and training the multi-modal machine translation model based on the image feature of the target visual sample and the text feature of the target back-translated text.

10. The multi-modal machine translation model training device according to claim 9, wherein the back translation module comprises at least two translation components connected in sequence, an input text of a first translation component of the at least two translation components is the target original text, and an output text of a last translation component is in a same language as the target original text.

11. The multi-modal machine translation model training device according to claim 10, the processor is further configured to:

determine the target original text as the input text of the first translation component comprised in the back translation module; and for any one of translation components other than the first translation component comprised in the back translation module, determining an input text of the translation component based on output texts of a previous translation component of the translation component.

12. The multi-modal machine translation model training device according to claim 11, the processor is further configured to:

calculate a loss rate of each of the output texts of the previous translation component of the translation component; and select part of the output texts of the previous translation component of the translation component based on the loss rates, and determine the selected output texts as the input text of the translation component.

13. The multi-modal machine translation model training device according to claim 12, the processor is further configured to:

determine N output texts, with the smallest loss rate, of the previous translation component of the translation component as the input text of the translation component; or determine an output text, with a loss rate less than a preset loss rate threshold, of the previous translation component of the translation component as the input text of the translation component.

14. The multi-modal machine translation model training device according to claim 10, wherein each of the translation components comprised in the back translation module respectively comprises a plurality of translation models.

15. The multi-modal machine translation model training device according to claim 9, the processor is further configured to:

determine whether back translation needs to be performed on the target original text comprised in the training sample pair based on a preset back translation parameter.

16. The multi-modal machine translation model training device according to claim 9, when it is determined that back translation does not need to be performed on the target original text, the processor is further configured to:

obtain a text feature of the target original text; and train the multi-modal machine translation model based on the image feature of the target visual sample and the text feature of the target original text.

17. A non-transitory computer-readable storage medium having a computer program stored thereon, wherein the computer program is configured to, when executed by a processor, cause the processor to:

obtain a training sample set, the training sample set comprising a plurality of training sample pairs, each of the training sample pairs comprising a visual sample and a corresponding original text; and train a multi-modal machine translation model for a plurality of rounds by successively using each of the training sample pairs in the training sample set until reaching a set end condition, wherein for any one of the training sample pairs in the training sample set, each time the multi-modal machine translation model is trained by using the training sample by the following steps:

obtaining an image feature of a target visual sample comprised in the training sample pair;

determining whether back translation needs to be performed on a target original text comprised in the training sample pair;

when back translation needs to be performed on the target original text comprised in the training sample pair, the original text is input into a first translation model of a back translation module, intermediate texts are selected from output texts of the first translation model, and the intermediate texts are input into a second translation model of the back translation module, a target back-translated text is randomly selected among back-translated texts output from the second translation model, and obtaining a text feature of the target back-translated text by performing language feature encoding on the target back-translated text; and training the multi-modal machine translation model based on the image feature of the target visual sample and the text feature of the target back-translated text.

* * * * *